United States Patent [19]
Kusano et al.

[11] 3,934,096
[45] Jan. 20, 1976

[54] MULTI-FREQUENCY SIGNAL RECEIVING CIRCUIT

[75] Inventors: Goro Kusano, Fujisawa; Hiroshi Kosugi; Yasuhiro Yamamura, both of Yokohama, all of Japan

[73] Assignee: Hitachi, Ltd., Japan

[22] Filed: Apr. 27, 1973

[21] Appl. No.: 355,276

[52] U.S. Cl. .......................................... 179/84 VF
[51] Int. Cl.² ...................................... H04M 1/00
[58] Field of Search ........ 179/84 VF; 328/138, 137, 328/140

[56] References Cited
UNITED STATES PATENTS

| | | | |
|---|---|---|---|
| 3,128,349 | 4/1964 | Boesch | 179/84 VF |
| 3,140,357 | 7/1964 | Bischof et al. | 179/84 VF |
| 3,288,940 | 11/1966 | Bennett et al. | 179/84 VF |
| 3,582,562 | 6/1971 | Sellari | 179/18 AD |
| 3,686,440 | 8/1972 | Kroeger | 179/5.5 |
| 3,875,347 | 4/1975 | Alaily | 179/84 VF |

Primary Examiner—Kathleen H. Claffy
Assistant Examiner—Joseph Popek
Attorney, Agent, or Firm—Craig & Antonelli

[57] ABSTRACT

A multi-frequency signal receiving circuit comprising a check circuit for discriminating the existence of a predetermined number of signal frequencies constituting a signal to produce an output, a timing circuit for delaying the output of the check circuit, a rectifying circuit for receiving the signal to detect the received signal energy and produce an output, a timing circuit for delaying the output of the rectifying circuit, an AND gate circuit for receiving the outputs of the two timing circuits to produce an output, and control means for controlling the transmission of the signal to the output circuit of the receiving circuit in accordance with the output of the AND gate circuit, whereby the normal operation of the receiving circuit can be ensured even when the signal frequencies arrive with a large arriving time difference and the operation start time is quickened.

6 Claims, 5 Drawing Figures

MULTI-FREQUENCY SIGNAL RECEIVING CIRCUIT

BACKGROUND OF THE INVENTION

1. Field of the Invention

This invention relates to a multi-frequency signal receiving circuit in which the normal operation can be ensured even when signal frequencies constituting a signal arrive with a large arriving time difference, the operation start time is quickened, and any fluctuation of an operation delay time and a release delay time due to an input signal level shaft is minimized.

2. Description of the Prior Art

There are two types of prior art systems for receiving a multi-frequency signal. In one such system each channel output obtained by rectifying an output of each of the filters of a receiving circuit corresponding to received signal frequencies, i.e., information of each channel, is applied to a common control circuit in which the arrival of a signal is discriminated by duration of a predetermined number of channel outputs not shorter than a predetermined period of time to control each channel output circuit. That is, only information of each channel is applied to the common control circuit but information with respect to received signal energy is not applied. In another type of system an output obtained by rectifying or amplification-rectifying an output of an input signal amplifier directly without using such filters, i.e., information with respect to received signal energy, is applied to a common control circuit in which the arrival of a signal is discriminated by duration of the received signal energy not shorter than a predetermined period of time to control each channel output circuit. That is, only information of the received signal energy is applied to the common control circuit but information of each channel is not applied.

These prior art systems have the following respective disadvantages. In the first prior art system, assuming that a signal is constituted by two frequencies, it happens that one signal frequency arrives with a delay of a certain period of time after the arrival of the other signal frequency because signal propagation delay time differs in dependence on the frequency in the case of a long transmission line. Even if this arriving time difference is in the order of one second, the normal operation of the receiver is requested. When the two signal frequencies are received with such an arriving time difference, a long period of time for checking the existence of a predetermined number of channel outputs is required for preventing a malfunction of the receiver. When operating in such a manner, however, if the two signal frequencies arrive at the same time, the time period from the signal arrival to the receiver output delivery, that is, the operation delay of the receiver is inevitably much prolonged. Namely, this first prior art system has a disadvantage in that a long operation period of the receiver is inevitably required in order to prevent a malfunction of the receiver due to a signal constituted by signal frequencies arriving with different arriving times.

In the second prior art system, because the arrival of a signal is discriminated by duration of received signal energy not shorter than a predetermined period, if a click noise is caused immediately before arrival of the correct signal, the common control circuit may discriminate it as the arrival of the correct signal. Therefore, it happens that a crosstalk output of a channel other than channels of the signal frequencies constituting the correct signal may be derived as the output of the receiver. Further, when two signal frequencies arrive with different arriving times, because the common control circuit discriminates the arrival of the earlier propagated signal frequency as the arrival of the correct signal by its energy, the receiver will deliver an output regarding only the earlier arrived signal frequency as a receiver output. Also, at arrival of the later propagated signal frequency, the receiver will deliver as its outputs an output regarding the later arrived signal frequency and a crosstalk output of another channel in addition to the already delivered output regarding the earlier arrived signal frequency. Thus, in the second prior art system, the receiver causes a malfunction in the case where there is induced a click noise immediately before the signal, or the arriving time difference between the two signal frequencies constituting the signal is large, which results in impossibility of use in this system in such an environment.

SUMMARY OF THE INVENTION

An object of the invention is to provide a multi-frequency signal receiving circuit in which the normal operation can be ensured even when signal frequencies constituting a signal arrive with a large arriving time difference and the operation time is quickened.

Another object of the invention is to provide a multi-frequency signal receiving circuit in which a fluctuation of the operation start time and release time due to an input signal level shift can be minimized to a large extent.

Still another object of the invention is to provide a multi-frequency signal receiving circuit in which an incorrect self-holding or latching of the output circuit due to a noise or the like can be prevented.

The main feature of the invention is that an output obtained by rectifying an output of each of the filters corresponding to received signal frequencies, i.e., information of each channel and an output obtained by rectifying or amplification-rectifing an output of an input signal amplifier directly without using a filter, i.e., information with respect to received signal energy are both applied to a common control circuit in which the arrival of a signal is discriminated on the basis of duration of a predetermined number of channel outputs not shorter than a predetermined period of time and duration of the received signal energy not shorter than another predetermined period of time to control an output circuit of each channel and in the common control circuit, timing circuits are provided respectively for the two kinds of information. This arrangement can eliminate the above defects of the prior art systems. Namely, according to this invention, it is possible to realize a multi-frequency signal receiver which normal operation can be ensured even when signal frequencies arrive with a large arriving time difference and the operation period is short.

According to another aspect of this invention, a rectifying circuit having a limiter characteristic is used for a rectifying circuit for conducting the information with respect to the received signal energy to the common control circuit, and thus such an additional effect can be obtained that any fluctuation of the release time of the receiver, which depends on the height of the input signal level, can be minimized to a large extent.

Further, according to still another aspect of this invention, a flip-flop circuit is used for controlling gate circuits for the output circuit of the receiver, which flip-flop circuit is driven by the two above-mentioned timing circuits. The outputs of the flip-flop circuit and the above-mentioned limiter circuit are fed to and AND circuit which delivers an output when receiving the two outputs. The output of the AND circuit is applied to another timing circuit which provides a time delay at the falling of the signal. The outputs of this timing circuit and the flip-flop circuit are applied to an output circuit of each channel so that a desired input gate for the output circuit of the receiver can be opened only for a desired short period of time. Thus, such an additional effect can be obtained that an incorrect self-holding of the output circuit of the receiver due to, for example, a noise can effectively be prevented.

DESCRIPTION OF THE PREFERRED EMBODIMENT

Figure 1:
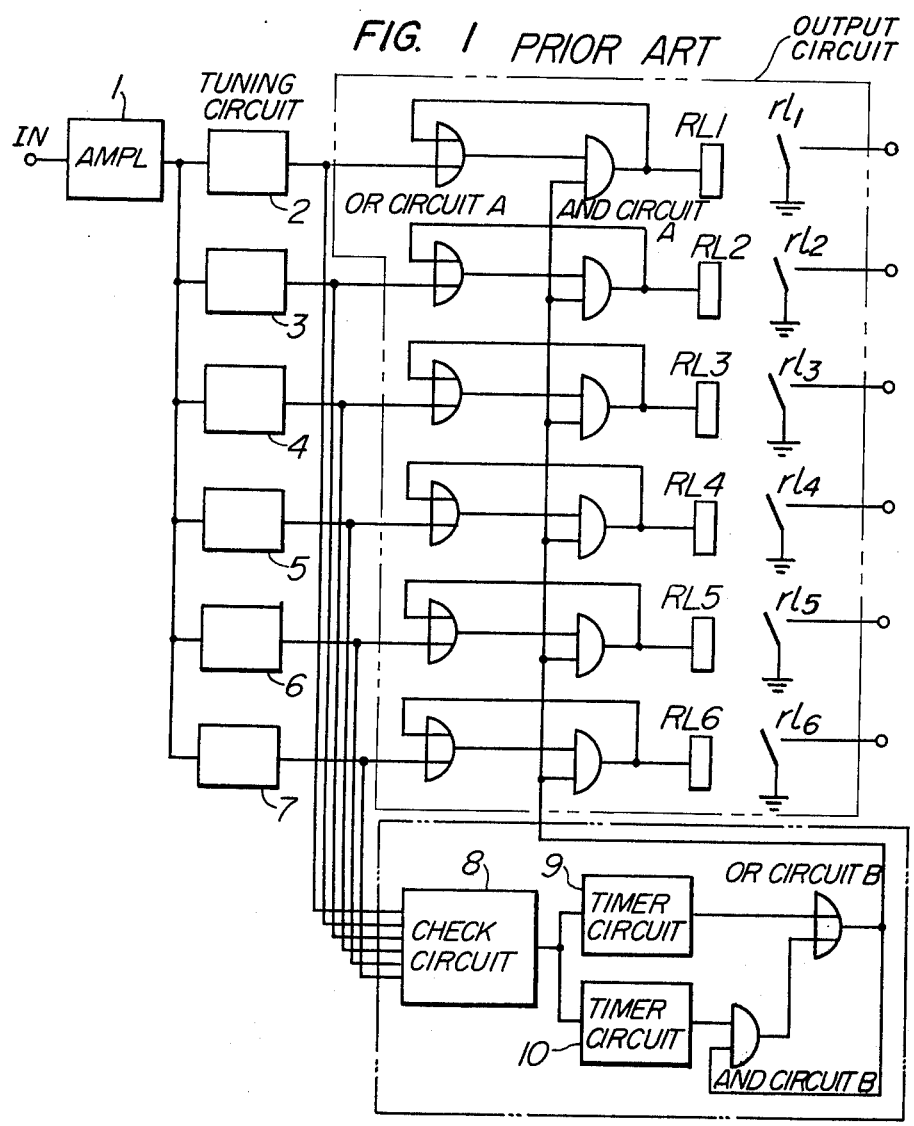
FIG. 1 is a circuit diagram of a conventional MFC(Multi-Frequency Code) receiving circuit according to the first prior art system.

Referring to FIG. 1, which shows an example of a conventional MFC receiving circuit according to the above-mentioned first prior art system, symbol IN designates an input terminal, numeral 1 designates an input signal amplifying circuit, numerals 2 to 7 designate tuning circuits possessing a tuning function for selecting signal frequency, each of which generates an output in response to an input signal frequency possessing a level more than a certain value. Hereinafter, this circuit is called a tuning circuit or a tuning rectifier circuit. Numeral 8 designates a conventional check circuit of the type which checks for the arrival of two of six signal frequencies in the case of MFC, i.e., checks that only two out of the tuning circuits 2 to 7 are generating their respective outputs. Numeral 9 designates a timer circuit for recognizing the continuation of the two out of six condition and numeral 10 designates a protective timer circuit which protects against any instantaneous disappearance of the two out of six condition.

Figure 2:
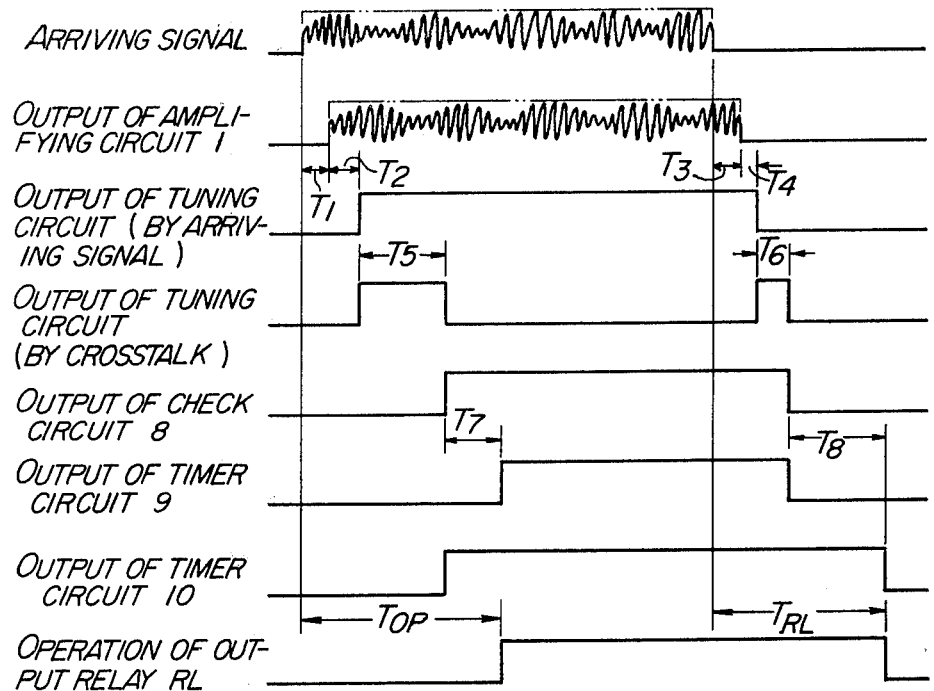
FIG. 2 is a time chart for explaining the operation of the circuit shown in FIG. 1.

A time chart in the case of a simultaneous arrival of two frequencies of the multi-frequency signal is shown in FIG. 2. In the figure, $T_1$ designates a rise time delay of the amplifying circuit, $T_2$ a rise time delay of the tuning circuit, $T_3$ a fall time delay of the amplifying circuit, $T_4$ a fall time delay of the tuning circuit, $T_5$ a crosstalk at athe rising of the signal, $T_6$ a crosstalk time at the falling of the signal, $T_7$ a signal continuation checking time of the timer circuit 9, $T_8$ a checking time of the protective timer circuit 10, $T_{OP}$ designates an operation start delay time of an output relay RL and is equal to $T_1 + T_2 + T_5 + T_7$, and $T_{RL}$ designates a release delay time of the output relay RL and is equal to $T_3 + T_4 + T_6 + T_8$.

A signal transmitted from the sending exchange office is received at the input terminal IN, amplified by the input signal amplifying circuit 1, and then fed to the tuning circuits 2 to 7. Among the tuning circuits 2 to 7, a circuit responsive to each of the two received signal frequencies generates the output thereof, thereby the gate of the corresponding AND circuit A is opened through the corresponding OR circuits A. On the other hand, the output from any of the tuning circuits 2 to 7 is fed to the check circuit 8, which check circuit confirms the fact that only two circuits among the six circuits of the tuning circuits 2 to 7 generate respective outputs and the check circuit 8 then generates an output thereof to be fed to the timer circuits 9 and 10. The timer circuit 9 possesses the characteristic that the rising delay time, that is the signal continuation check time $T_7$, thereof is comparatively long and the falling delay time thereof is short, while the timer circuit 10 possesses the characteristic that the rising delay time thereof is short and the falling delay time thereof is comparatively long, that is, the protection time $T_8$ against the instantaneous disappearance of the signal. An OR circuit B generates an output by means of the output of the timer circuit 9. $T_7$ is the signal continuation check time.

The AND circuit A generates an output by means of this output of the OR circuit B and the output of timer circuit 10 so that the output relay RL corresponding to the tuning circuit responsive to each of the two received signal frequencies commences to operate. A part of the output of the AND circuit A is positively fed back to the OR circuit A so that the output of the AND circuit A is maintained until the gate of the AND circuit A is closed, that is, the output of the OR circuit B disappears. Namely, OR circuit A and AND circuit A constitute a self-holding or self-latching gate circuit. While a part of the output of the OR circuit B is fed back to the AND circuit B so that the OR circuit B is self-maintained and generates the output thereof until the output of the timer circuit 10 disappears. Namely, the releasing of the output relay RL is controlled by the output of the timer circuit 10. Since the releasing delay of the timer circuit 10 corresponds to constant time $T_8$, the timer circuit continues to generate the output thereof even though the output of the check circuit 8 temporarily disappears by a temporary input signal interruption on the line, if the interruption time is shorter than $T_8$, whereby an malfunction is prevented.

However, since an FMC signal is intermittently transmitted, it very often happens that an output is generated from not only each of the two circuits responsive to the signal frequencies among the tuning circuits 2 to 7, but also from another circuit due to the crosstalk at the time of rising and falling of the signal. The higher the input signal level is, the longer the times $T_5$ and $T_6$ when an output is generated by the crosstalk become. And the times $T_5$ and $T_6$ become longest when the receiver receives from the line a disturbing wave of the same frequency as the tuning frequency of a tuning circuit generating an output by the crosstalk. In this case, the time $T_5$ when an output is generated by the crosstalk at the rising of the signal becomes 20 – 25 ms. and the time $T_6$ at the falling of the signal becomes 5 –10 ms.

As a result, it happens that the check circuit 8 makes a detection as if the signal were continuing, whereas the signal has already disappeared, and therefore the releasing of the output relay RL of the receiver circuit is late by that amount. Namely, the release delay time $T_{RL}$ of the output relay RL of the receiver circuit fluctuates by the change of the crosstalk time $T_6$ due to an input signal level shift.

On the other hand, at the time of rising of the signal, in the case of the simultaneous arrival of the two frequencies of the signal, the check circuit 8 does not operate to generate the output thereof because an output is generated from another tuning circuit due to the crosstalk besides two tuning circuits responsive to the two signal frequencies, and therefore the output relay RL corresponding to any of the frequencies of the signal operates late by the crosstalk time $T_5$. That is, the operation start delay time $T_{OP}$ of the output relay RL of the receiver circuit fluctuates by the crosstalk time $T_5$ due to an input signal level shift.

Here, considering the case of the arrival of the signal frequencies at different periods, for example, the case that one signal frequency arrives at the tuning circuit 4 a second after the other signal frequency arrived at the tuning circuit 2, then crosstalk output is derived from the tuning circuit 3 at the samae time that the signal output is obtained from the tuning circuit 2, and this crosstalk time $T_5$ becomes 20 – 25 ms. at the worst as previously described. In this case, a malfunction is caused if the check time $T_7$ of the timer circuit 9 for evaluating the continuation of the two out of six condition is shorter than the crosstalk time $T_5$.

If the check time $T_7$ is made longer than the time $T_5$ so as to prevent such a malfunction, the operation start delay time $T_{OP}$ from the arrival of the signal to the operation of the output relay RL becomes longer than 50 ms. in the case of a simultaneous arrival, because of the relation of $T_{OP} = T_1 + T_2 + T_5 + T_7$, $T_7 > T_5$ and $T_5 = 25$ ms..

Figure 4:
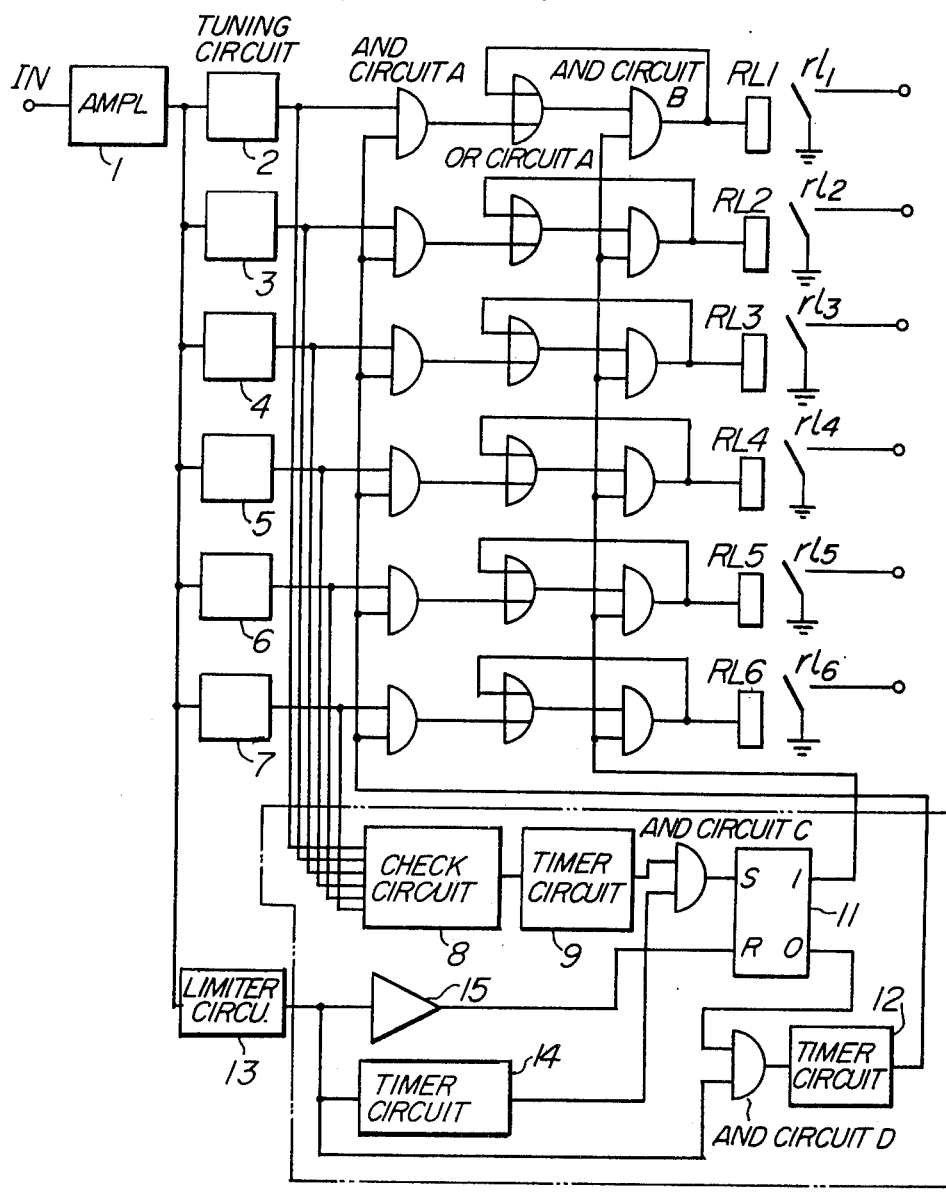
FIG. 4 is a circuit diagram of an MFC receiving circuit showing an embodiment of the present invention.

The present invention removes the above-mentioned defects, of which an embodiment is shown in FIG. 4. In the figure, symbol IN designates an input terminal, numerals 1 to 9 designate respectively the same circuits as those shown in FIG. 1. Numeral 8 designates a check circuit which is the same as the check circuit 8 described in connection with the system of FIG. 1. Its output is obtained when, and only when, two out of six inputs are derived from the tuning circuits 2 – 7. Such two-out-of-six logic circuits are well known, being constructed of typical logic gates such as AND or OR gates using conventional logic. In FIG. 4 numeral 11 designates a flip-flop circuit, symbols S and R being the set side and reset side terminals thereof, respectively. This flip-flop circuit generates output 1 on the terminal 1 and output 0 on the terminal 0 when a signal 1 is applied to the set side. Numeral 12 designates a timer circuit, numeral 13 a rectifying circuit, the rising delay thereof being short and the falling delay being comparatively long (the falling delay time $T_9$ is the one for the protection against the temporary disappearance of a signal), which rectifying circuit is hereinafater called a limiter circuit, numeral 14 a timer circuit which makes it possible that the crosstalk at the rising of the signal is neglected. In this circuit, another timer circuit 9 evaluates the output duration of the check circuit 8. Numeral 15 designates an inverter circuit.

Figure 5:
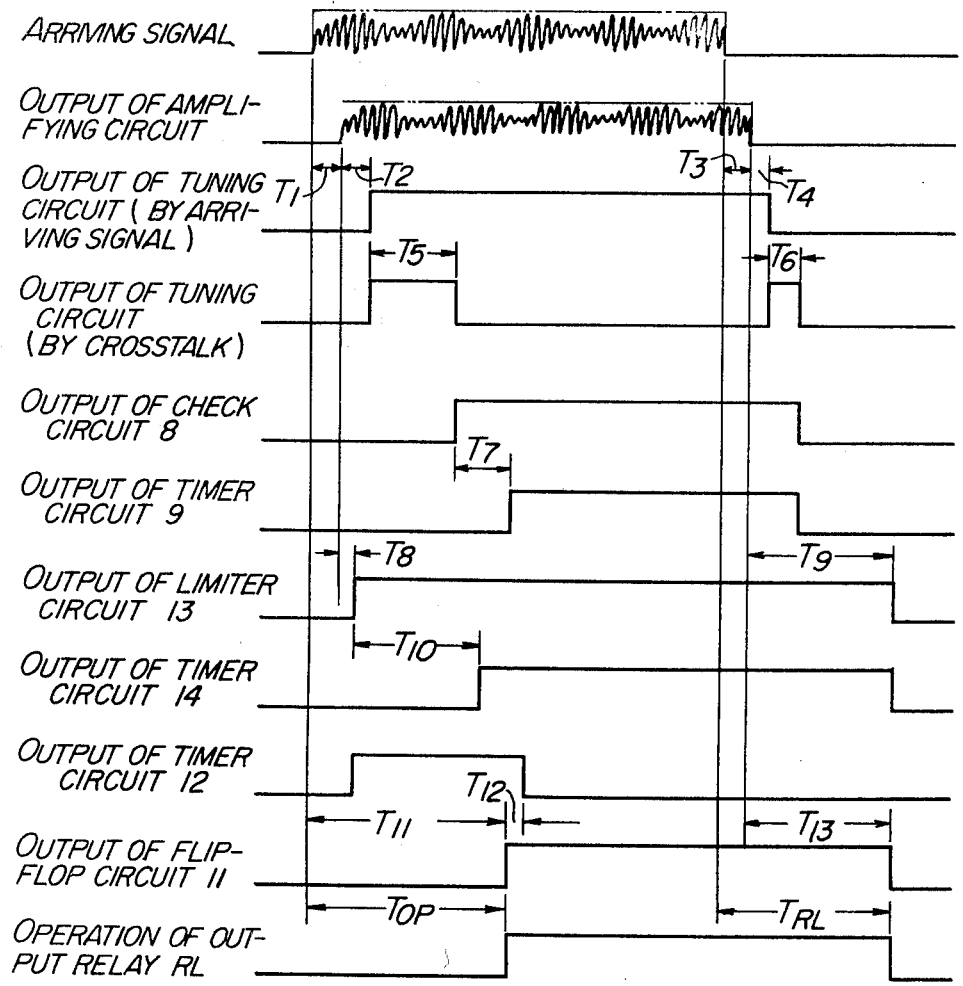
FIG. 5 is a time chart for explaining the operation of the circuit shown in FIG. 4.

FIG. 5 shows a time chart in the case of the simultaneous arrival of the signal frequencies in the receiver circuit according to the present invention. In the figure, $T_1$ designates the rise delay time of the amplifying circuit; $T_2$ designates the rise delay time of the tuning circuit; $T_3$ designates the fall delay time of the amplifying circuit; $T_4$ designates the fall delay time of the tuning circuit; $T_5$ designates the crosstalk time at the rising of a signal; $T_6$ designates the crosstalk time of the falling of the signal; $T_7$ designates the signal continuation check time of the timer circuit 9; $T_8$ designates the rise delay time of the limiter circuit 13; $T_9$ designates the fall delay time of the limiter circuit 13; $T_{10}$ designates the rise delay time of the timer circuit 14. $T_{11}$ designates the time delay from the signal arrival to the setting of the flip-flop circuit 11; $T_{12}$ designates the delay time in the timer circuit 13; and $T_{13}$ designates the delay time from the signal disappearance to the resetting of the flip-flop circuit 11. $T_{OP}$ designates the operation delay time from the arrival of the signal to the operation of relay RL and is equal to $T_1 + T_2 + T_5 + T_7$ or $T_1 + T_8 + T_{10}$. $T_{RL}$ designates a release delay time from the signal arrival to the release of relay RL and is equal to $T_3 + T_9$ or $T_3 + T_{13}$.

In the circuit according to the invention, a signal frequency amplified by the input signal amplifying circuit 1 is conducted to the limiter circuit 13 in addition to the tuning circuits 2 and 7. Among the tuning circuits 2 to 7, a circuit responsive to each of the two signal frequencies generates an output which is fed to the AND circuit A to open the gate thereof. On the other hand, the output of the limiter circuit 13 is fed to the AND circuit D as well as to the timer circuit 14 to generate an output from the ANd circuit D together with the reset side output of the flip-flop circuit 11. The output of the AND circuit D is conducted to the six AND circuits A through the timer circuit 12 so that only two AND circuits A corresponding to the signal frequencies generate respective outputs which are fed to the respective AND circuits B to open the gate thereof through the respective OR circuits A. The output of the AND circuit A is controlled by the output of the timer circuit 12. The output generating time of the AND circuit A is equal to the sum of the time from the output of the limiter circuit 13 being generated to the flip-flop circuit 11 being set and the fall delay time $T_{12}$ of the timer circuit 12. When the flip-flop circuit 11 is set, the AND circuit B generates an output, a part of which is fed back to the OR circuit A. After this feedback has been performed, the output of OR circuit A is maintained even if the output of AND circuit 13 A ceases. Namely, AND circuit B and OR circuit A perform a self-holding or self-latching operation as long as flip-flop circuit 11 remains in the set state. Since the output of timer circuit 12 ceases a time $T_{12}$ after the opening of the AND circuit B, the feedback can be performed with certainty. Thereafter the output of the AND circuit B is controlled by the set side output of the flip-flop circuit 11.

The timer circuit 14 generates its output subsequent to the generation of the output of the limiter circuit 13 by a time $T_{10}$ for checking out against the crosstalk time $T_5$, thereby opening the gate of the AND circuit C. Then the AND circuit C is made to generate its output in response to an output which is generated from the timer circuit 9 subsequent to the output of the check circuit 8 by the amount of the signal continuation check time $T_7$. As a result, the flip-flop circuit 11 is set and then the AND circuit B is made to generate its output, thereby making the output relay RL operate.

If the output of the timer circuit 9 is generated earlier than the output of the timer circuit 14, the output of the timer circuit 9 opens the gate of the AND circuit C, which AND circuit C is then made to generate the output in response to the output of the timer circuit 14, whereby the flip-flop circuit 11 is set. In the case of the releasing of the output relay, the flip-flop circuit 11 is reset by means of the falling output of the limiter circuit 13, thereby the output relay RL is released. Because the limiter circuit 13 possesses the short starting delay time $T_8$ and comparatively long input extension time $T_9$, even if a temporary disappearance $\Delta T$ of the arriving signal should occur the output of the limiter circuit 13 does not temporarily disappear provided that the interruption duration $\Delta T$ satisfies the inequality of $\Delta T + T_1 + T_8 < T_9$ as shown in FIG. 5. Further, the limiter circuit does not recognize the ending of the signal unless all signals are stopped during the time not less than $T_3 + T_9 - T_8$. That is, the limiter circuit functions to protect the receiver circuit against the temporary disappearance of the signal and to recognize the ending of the arrival of the signal.

There are no fluctuations of $T_9$ i.e., the fall delay, of the limiter circuit 13 due to the input signal level shift because of the limiting characteristics of the limiter circuit 13. Furthermore, the limiter circuit 13 does not suffer any influence due to crosstalk. Therefore the release delay time $T_{RL}$ of the output relay RL does not fluctuate because it is defined by the falling delay time of the limiter circuit 13 even if the crosstalk time $T_6$ at the falling of the signal in the tuning circuits fluctuates.

Figure 3:
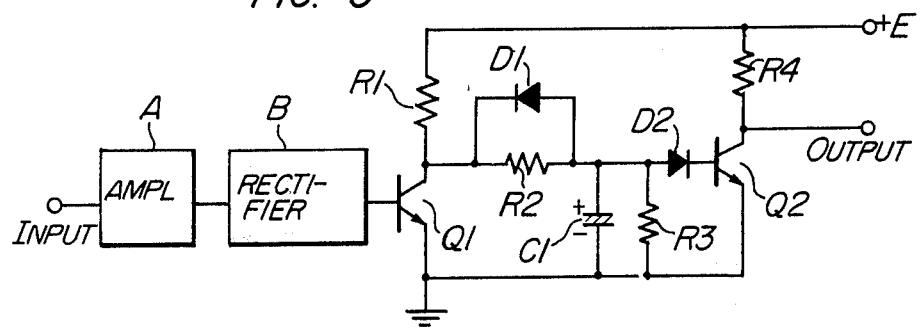
FIG. 3 is a circuit diagram showing an example of a limiter rectifying circuit.

FIG. 3 shows an embodiment of the limiter circuit represented by numeral 13 in FIG. 4, which possesses short starting delay time and comparatively long input extension time. In the figure, symbol A designates an amplifying circuit having a limitier characteristic, B a rectifying circuit, symbols $Q_1$ and $Q_2$ designate NPN transistors, $D_1$ and $D_2$ diodes, $R_1$ to $R_4$ resistors, symbol $C_1$ designates a capacitor and +E a D.C. power supply terminal.

Assuming that the amplification degree of the amplifying circuit A is so selected that the output of the rectifying circuit B may saturate the transistor $Q_1$ even when an input signal level is at the lower limit of the sensible level of the receiver circuit and the resistors $R_1$ and $R_2$ possess high resistance, at the time of the arrival of a signal, the transistor $Q_1$ is put into the ON state by the output of the rectifying circuit B, the electric charge of the capacitor $C_1$ is discharged through the diode $D_1$, the collector of the transistor $Q_1$ and the emitter thereof, and therefore the transistor $Q_2$ is put into the OFF state almost simultaneously when the transistor $Q_1$ is put into the ON state, thereby the output thereof becomes 1. In the case where the signal disappears and thereby the transistor $Q_1$ is put into the OFF state, since the capacitor $C_1$ is charged through the resistors $R_1$ and $R_2$, the charging time becomes long so that the transistor $Q_2$ is put into the ON state later by a time constant defined by the summed resistance value of the resistors $R_1$ and $R_2$ and the capacitance value of the capacitor $C_1$, thereby the output thereof becoming 0, 0 and 1 representing the ground potential and the +E, respectively.

As described above, the transistor $Q_2$ can be put into the ON state later by a time constant in accordance with the resistors $R_1$ and $R_2$ and the capacitor $C_1$, independently of the input signal level.

Consider the case of the simultaneous arrival of the signal frequencies in the receiver circuit of this invention, in the case of a low input signal level, since the crosstalk is small and therefore any one of the tuning circuits 2 to 7 will not generate an output due to the crosstalk, the operation start delay time $T_{OP}$ of the output relay RL is equal to the sum of the rise time delay $T_1$ of the input signal amplifying circuit 1, the rise time delay $T_8$ of the limiter circuit 13 and the check time $T_{10}$ of the timer circuit 14 (because of the inequality of $T_1 + T_2 + T_7 < T_1 + T_8 + T_{10}$); while, in the case of a higher input signal level, the operation start delay time $T_{OP}$ of the output relay RL is equal to the sum of the rise time delay $T_1$ of the input signal amplifying circuit 1, the rise time delay $T_2$ of the tunig circuit, the crosstalk time $T_5$ at the rising of the signal and the check time $T_7$ of the timer circuit 9 (because of the inequality of $T_1 + T_2 + T_5 + T_7 > T_1 + T_8 + T_{10}$), which operation start delay time is hereinafter symbolized $T_{OP}'$ to be distinguished from the operation start delay time $T_{OP}$ of the output relay RL in the case of a low input signal level.

The check time $T_7$ of the timer circuit 9 can be fixed independently of the crosstalk time and therefore can be selected to be shorter than the crosstalk time at the rising of the signal while it is necessary that $T_7$ is longer than $T_5$ in a conventional receiver circuit as previously described. Further, it is only necessary that the check time $T_{10}$ of the timer circuit 14 should be longer than the maximum crosstalk time $T_5$ at the rising of the signal. Therefore, the operation starting delay of the output relay RL can be quickened reduced according to the present invention as compared to a prior art receiver.

Furthermore, if the check times $T_7$ and $T_{10}$ of the respective timer circuits 9 and 14 are so fixed that $T_{OP}$ is nearly equal to $T_{OP}'$, the fluctuations of the operation start delay time of the output relay RL due to the input signal level shift can be minimized.

Consider the case of the arrival of signal frequencies at different times. Although the limiter circuit generates an output in response to receipt of the first signal frequency, the timer circuit 14 generates an output a time $T_{10}$ thereafter which is longer than the maximum value of the crosstalk time $T_5$, and thereby any malfunction due to crosstalk at the rising of the signal can be avoided, $T_{OP}$ i.e., the operation start delay time from the arrival of the second signal frequency to the operation of output relay RL is equal to the sum of the rise delay time $T_1$ of the input signal amplifying circuit 1, the rise delay time $T_2$ of the tuning circuit, the crosstalk time $T_5$ at the rising of the signal and the check time $T_7$ of the timer circuit 9, because the output of timer circuit 14 is continued from the arrival of the first signal frequency.

As clearly understood from the above description, according to the present invention, it is possible to realize a multi-frequency signal receiver such that the normal operation can be ensured even when signal frequencies constituting the signal arrive with a large arriving time difference and the operation period can be made short. In addition to this essential effect, it is possible to obtain the effects that a fluctuation of the release time of the receiver due to the input signal level shift is scarcely caused by the use of the rectifying circuit having a limiter characteristic and that an incorrect self-holding or self-latching of the output circuit of the receiver due to a noise or the like can be prevented because each of the input gates for the receiver output circuit is opened only for a short period of time as understood from the state of the output of the timer circuit 12 shown in FIG. 5.

The present invention is applicable to not only the MFC receiver circuit, but also is applicable to a multi-frequency signal receiver circuit or the like for receiving signal frequencies which arrive at different times. Further, it is a matter of course that the output of the receiver circuit need not be constituted by relays.

We claim:

1. A multi-frequency signal receiving circuit having an input signal amplifier, a plurality of frequency detectors each including a tuning circuit for generating an output in response to a signal of selected frequency received from the output of the input signal amplifier, and output circuit means connected to the outputs of said frequency detectors for controlling the transmission of the received signal, which comprises:
   check circuit means connected to said frequency detectors for detecting the existence of a predetermined number of outputs of said frequency detectors and for generating an output only when a predetermined number of outputs are detected;
   first timing circuit means connected to the output of said check circuit means for delaying the transmission of the output thereof;
   rectifying circuit means connected to the output of said input signal amplifier for cnverting the received signal energy to a direct-current signal;
   second timing circuit means connected to the output of said rectifying circuit means for delaying the transmission of the output thereof;
   first AND gate means connected to said first and second timing circuits and operating when simultaneously receiving the outputs of said first and second timing circuit means; and
   control means operating in response to the output of said AND gate means for controlling the transmission of the received signal in said output circuit means.

2. A multi-frequency signal receiving circuit according to claim 1, wherein said rectifying circuit is a limiter rectifying circuit which possesses the characteristic of both quick rise and late fall times, said rise and fall times being unchanged according to the input signal level.

3. A multi-frequency signal receiving circuit according to claim 2, wherein said control means includes a flip-flop circuit which is set by the output of said AND gate means and which is reset by the output of said limiter rectifying circuit, second AND gate means having a pair of inputs connected to the reset output of said flip-flop circuit and the output of said limiter rectifying circuit, respectively, a third timing circuit means connected to the output of said second AND gate means for providing an output with a time delay with respect to the setting of said flip-flop circuit, and means connecting the set output of said flip-flop circuit and the output of said third timing circuit means to said output circuit means whereby the output of each tuning circuit is connected to the output circuit means during a period of time between the appearance of the set side output of said flip-flop circuit and the disappearance of the output of said third timing circuit means and whereby said output circuit means is operated in response to any one of the signal frequencies during said period of time, while the output of any one of said tuning circuits is blocked after the disappearance of the output of said third timing circuit means.

4. A multi-frequency signal receiving circuit according to claim 3, wherein said output circuit means includes a plurality of self-latching gate circuits each connected between a respective one of said frequency detectors and a respective output of the signal receiving circuit, the output of said flip-flop circuit being connected in control of each of said self-latching gate circuits.

5. A multi-frequency signal receiving circuit according to claim 4, wherein said output circuit means further includes third AND gate means connected between the outputs of said frequency detectors and said self-latching gate circuits, said third AND gate means being controlled by the output of said third timing circuit means.

6. A multi-frequency signal receiving circuit according to claim 5, wherein said first AND gate means is connected to the set input of said flip-flip circuit, and further including an inverter circuit connected between the output of said limiter rectifying circuit and the reset input of said flip-flop circuit.

* * * * *